(12) United States Patent
Chen

(10) Patent No.: US 9,031,014 B2
(45) Date of Patent: May 12, 2015

(54) METHOD AND DEVICE FOR AGGREGATING A PLURALITY OF SERVICE DATA FROM MACHINE TERMINAL EQUIPMENT

(75) Inventor: Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 50 days.

(21) Appl. No.: 13/505,545

(22) PCT Filed: Nov. 3, 2009

(86) PCT No.: PCT/CN2009/074771
§ 371 (c)(1),
(2), (4) Date: May 2, 2012

(87) PCT Pub. No.: WO2011/054142
PCT Pub. Date: May 12, 2011

(65) Prior Publication Data
US 2012/0218965 A1    Aug. 30, 2012

(51) Int. Cl.
*H04W 4/00* (2009.01)
*H04W 28/06* (2009.01)
*H04W 72/04* (2009.01)
*H04W 8/24* (2009.01)

(52) U.S. Cl.
CPC ........ *H04W 28/065* (2013.01); *H04W 72/0406* (2013.01); *H04W 4/005* (2013.01); *H04W 8/24* (2013.01); *Y02B 60/50* (2013.01)

(58) Field of Classification Search
CPC ... H04W 28/04; H04W 2/065; H04W 76/022; H04W 76/023; H04W 72/04; H04W 8/24; H04W 72/0406; H04W 72/0453
USPC .......................................... 370/315, 328, 329
See application file for complete search history.

(56) References Cited

U.S. PATENT DOCUMENTS 6,014,089 A    1/2000    Tracy et al.
6,900,737 B1   5/2005    Ardalan et al.
(Continued)

FOREIGN PATENT DOCUMENTS

CN    1805595 A    7/2006
CN    101102298 A   1/2008
(Continued)

OTHER PUBLICATIONS

Ericsson, 3GPP TSG-RAN WG2#58, Tdoc R2-071817, "Solution for sending NAS together with RRC connection request" Kobe, Japan, May 7-11, 2007.*
(Continued)

*Primary Examiner* — Afsar M Qureshi
(74) *Attorney, Agent, or Firm* — Fay Sharpe LLP

(57) ABSTRACT

The invention proposes a method and device for aggregating a plurality of service data from a terminal equipment. A first network device in a radio access network encapsulates a plurality of service data from a machine terminal equipment into a non-access stratum data packet, performs a transmission process on the non-access stratum data packet to generate a processed signal and transmits the processed signal. The signal is forwarded by a base station to a second network device in a core network. The second network device recovers the data packet from the signal, extracts the plurality of service data from the data packet and then transmits the plurality of service data respectively to a corresponding destination server. A signaling overhead and thus radio resources in a radio access network can be saved, and preferably a period of time for a terminal equipment to wait for a feedback can also be shortened.

13 Claims, 5 Drawing Sheets

(56) References Cited

U.S. PATENT DOCUMENTS

| | | | |
|---|---|---|---|
| 7,433,453 B2* | 10/2008 | Aebi | 379/114.2 |
| 8,270,433 B2* | 9/2012 | Jiang | 370/466 |
| 8,370,729 B2* | 2/2013 | Ko et al. | 714/790 |
| 8,400,935 B2* | 3/2013 | Pelletier et al. | 370/252 |
| 8,428,086 B2* | 4/2013 | Lee et al. | 370/469 |
| 2004/0114593 A1* | 6/2004 | Dick et al. | 370/389 |
| 2004/0185860 A1* | 9/2004 | Marjelund et al. | 455/450 |
| 2007/0121540 A1* | 5/2007 | Sharp et al. | 370/328 |
| 2007/0147315 A1* | 6/2007 | Khoury et al. | 370/338 |
| 2008/0153521 A1 | 6/2008 | Benaouda et al. | |
| 2008/0267405 A1* | 10/2008 | Vialen et al. | 380/270 |
| 2009/0219843 A1* | 9/2009 | Chin et al. | 370/310 |
| 2010/0130218 A1* | 5/2010 | Zhang et al. | 455/450 |
| 2010/0284278 A1* | 11/2010 | Alanara | 370/235 |
| 2010/0290437 A1* | 11/2010 | Wang et al. | 370/335 |
| 2011/0296719 A1* | 12/2011 | Sories et al. | 37/315 |

FOREIGN PATENT DOCUMENTS

| | | |
|---|---|---|
| CN | 101267418 A | 9/2008 |
| CN | 101325530 A | 12/2008 |
| CN | 101420374 A | 4/2009 |
| KR | 2005-0072807 | 7/2005 |
| WO | WO 2007/081146 A1 | 7/2007 |
| WO | WO2007/081146 A1 | 7/2007 |
| WO | WO 2009/075240 A1 | 6/2009 |
| WO | WO2009/075240 A1 | 6/2009 |

OTHER PUBLICATIONS

3GPP TSG-RAN WG2# 58, TDoc R2-071817, EEICSSON, "Solution for Sending NAS Together With RRC Connection Request" Kobe, Japan, May 7-11, 2007.*

International Search Report for PCT/CN2009/074771 dated Aug. 26, 2010.

Chen et al., "Cellular Based Machine to Machine Communication with Un-Peer2Peer Protocol Stack", Vehicular Technology Conference Fall (VTC 2009-Fall), 2009 IEEE 70$^{th}$, Sep. 23, 2009, pp. 1-5.

Japanese Office Action (with Translation) of corresponding Japanese Patent Application No. 2012-537279, Drafted Jul. 5, 2013, Transmitted Jul. 11, 2013, 6 pages.

European Search Report for 09851026.6 dated Jun. 16, 2014.

* cited by examiner

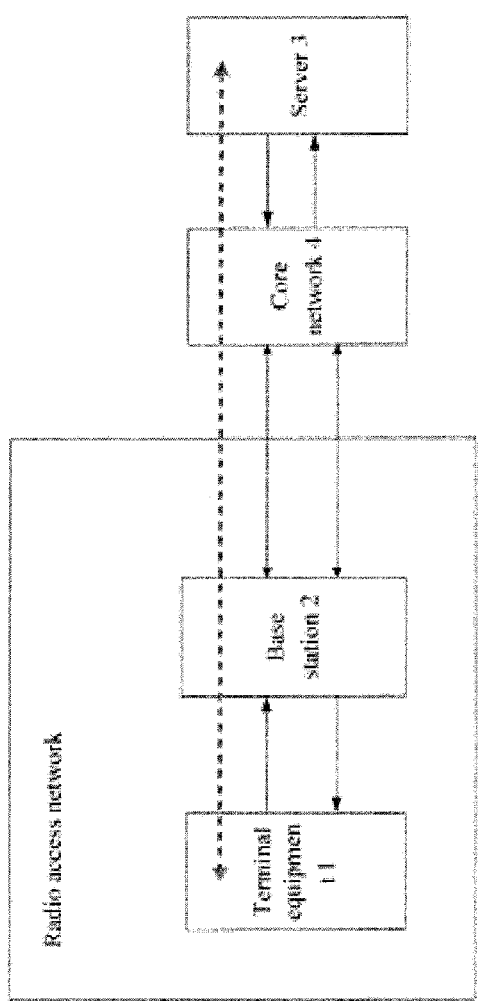
Fig.1 -PRIOR ART-
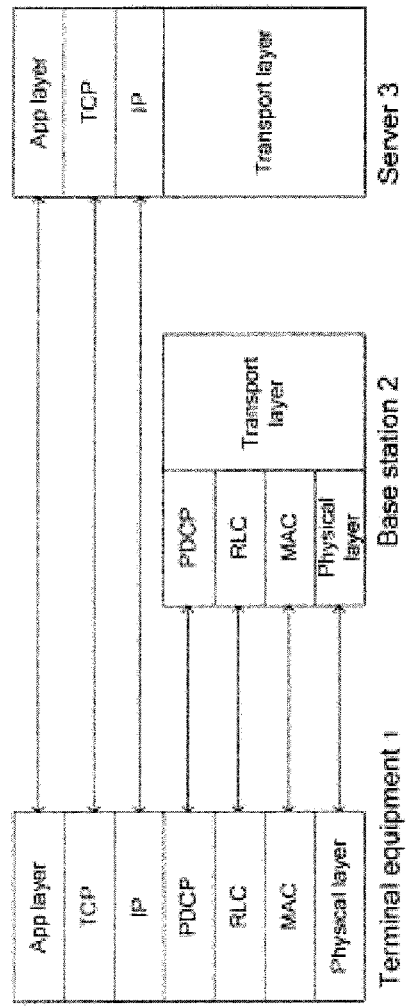
Fig.2 -PRIOR ART-

METHOD AND DEVICE FOR AGGREGATING A PLURALITY OF SERVICE DATA FROM MACHINE TERMINAL EQUIPMENT

This application is a U.S. national stage entry under 35 U.S.C. §371 of PCT/CN2009/074771, filed Nov. 3, 2009, which application is hereby incorporated by reference.

FIELD OF THE INVENTION

The present invention relates to a radio network and particularly to an operation of a network device for aggregating service data from a terminal equipment.

BACKGROUND OF THE INVENTION

Traditional communication involving a person is characterized in an unspecific operating application. For example, a user chooses to browse a webpage, to play a video, etc., through an input device, e.g., a keyboard, a mouse, a tablet, etc., of a terminal equipment and thus initiates a variety of applications. Correspondingly, Machine to Machine Communication (M2M) is data communication, conducted between entities, in which interaction with a person may not necessarily be required. M2M communication differs from an existing human-machine interaction model in that:

There is a new or different market prospect of applications;
There is a lower cost;
There are a large number of potential machine communication terminal equipments; and
The majority of traffic volumes of each machine terminal equipment are low.

Therefore M2M communication is promising to be a characteristic or an application in the IMT-Advanced. A market survey shows the market of M2M communication will grow rapidly and become applied widely in the industry and the in the consumption market.

An M2M terminal equipment includes a sensor, for example. Typically an application operating on the M2M sensor is unique and specific, for example, an M2M terminal equipment is only responsible for reporting temperature data to a server to monitor a change in temperature, and another M2M terminal equipment is only responsible for reporting data of a gas meter, etc., to the server. Therefore an M2M terminal equipment is at a low cost and expected to be suitable to a large-scale application.

An existing terminal equipment has to perform considerable interaction of signaling with a network prior to establishment of a communication and transmission of service data therebetween. A signaling overhead can be negligible as compared with service data because there is a large amount of service data for an application, e.g., voice communication, video transmission, etc., requested by the existing terminal equipment. However the amount of uplink service data transmitted by general M2M terminal equipment is typically low in M2M communication, and such signaling interaction in an existing communication system may not be suitable for M2M communication due to a considerable overhead and an increase in the complexity of transmitting service data.

FIG. 1 illustrates a schematic structural diagram of a network of an existing communication system, where an M2M terminal equipment 1 operates like a traditional mobile terminal equipment. The terminal equipment 1 interacts with a base station 2 (as represented by a solid line A in FIG. 1) and interacts with an M2M server 3 in an upper layer protocol, e.g., a Non-Access Stratum (NAS) protocol in the 3GPP, etc., (as represented by a dotted line B in FIG. 1). Therefore a plurality of handshakes at different peer layers are required, but the amount of actually transmitted data, i.e., the amount of service data, is very low. Thus there is considerable redundancy resulting from uplink transmission of the terminal equipment. In other words, the existing network architecture is very uneconomic for M2M communication.

FIG. 2 illustrates a protocol stack of the existing system. Signaling interaction between the terminal equipment 1 and the base station 2 as well as between the terminal equipment 1 and the server 3 at respective protocol layers in the prior art will be described in details as exemplified in FIG. 2. As illustrated in FIG. 2, a Radio Access Network (RAN) including the base station interacts with the terminal equipment 1 in handshakes at respective underlying layers including the physical layer (PHY) and the Media Access Control (MAC) layer and then in a handshake at the Packet Data Convergence Protocol (PDCP) layer. The terminal equipment 1 will further establish a Transport Control Protocol (TCP) connection and even an application layer connection with the server 3 (as represented by a dotted line in FIG. 2) also in a plurality of required rounds of handshakes including transmission of a reception acknowledgement message. Therefore the terminal equipment 1 has to keep awake for a long period of time which consumes power on one hand and is required to receive and transmit more redundant signaling messages in this network architecture on the other hand.

SUMMARY OF THE INVENTION

The invention proposes a method and device for aggregating service data from a machine terminal equipment, and particularly in a radio access network, a first network device encapsulates a plurality of service data from a machine terminal equipment into a non-access stratum data packet, performs a transmission process on the non-access stratum data packet to generate a processed signal and transmits the processed signal; and the signal is forwarded via a base station to a second network device in a core network, and the second network device recovers the non-access stratum data packet from the signal, extracts the plurality of service data from the non-access stratum data packet and then transmits the plurality of service data respectively to a corresponding destination server.

According to a first aspect of the invention, there is provided a method for transmitting data in a first network device of a radio network, which includes the steps of: obtaining a plurality of service data from one or more terminal equipments over a radio channel; encapsulating the plurality of service data into a non-access stratum data packet; and performing a transmission process on the non-access stratum data packet to generate a processed signal and transmitting the processed signal.

According to a second aspect of the invention, there is provided a method, for forwarding data from a first network device, in a base station of a radio network, which includes the steps of: receiving a signal from the first network device, wherein the signal includes a plurality of service data, transmitted from one or more terminal equipments over a radio channel, encapsulated into a non-access stratum data packet; and ii. forwarding the signal to a second network device.

According to a third aspect of the invention, there is provided a method, for assisting a first network device in transmitting data, in a second network device of a radio network, wherein the first network device is configured to encapsulate a plurality of service data from one or more terminal equipments into a non-access stratum data packet and to transmit a signal generated by processing the non-access stratum data packet to a base station, and the method includes the steps of: receiving the signal, from the first network device, forwarded by the base station, wherein the signal includes a plurality of service data, encapsulated in the non-access stratum data packet, transmitted from the one or more terminal equipments to one or more corresponding destination servers over a radio channel; recovering the non-access stratum data packet from the signal and extracting the plurality of service data from the non-access stratum data packet; and transmitting the plurality of service data respectively to the corresponding destination server or servers.

According to a fourth aspect of the invention, there is provided a transmitting apparatus for transmitting data in a first network device of a radio network, which includes: an obtaining means configured to obtain a plurality of service data from one or more terminal equipments over a radio channel; an encapsulating means configured to encapsulate the plurality of service data into a non-access stratum data packet; and a first transmitting means configured to perform a transmission process on the non-access stratum data packet to generate a processed signal, and to transmit the processed signal.

According to a fifth aspect of the invention, there is provided a processing apparatus, for forwarding data from a first network device, in a base station of a radio network, which includes: a first receiving means configured to receive a signal from the first network device, wherein the signal includes a plurality of service data, transmitted from one or more terminal equipments over a radio channel, encapsulated into a non-access stratum data packet; and a forwarding means configured to forward the signal to a second network device.

According to a sixth aspect of the invention, there is provided an assisting apparatus, for assisting a first network device in transmitting data, in a second network device of a radio network, which includes: a second receiving means configured to receive a signal, from the first network device, forwarded by a base station, wherein the signal includes a plurality of service data, encapsulated in the non-access stratum data packet, transmitted from one or more terminal equipments to one or more corresponding destination servers over a radio channel; an extracting means configured to recover the non-access stratum data packet from the signal and to extract the plurality of service data from the non-access stratum data packet; and a second transmitting means configured to transmit the plurality of service data respectively to the corresponding destination server or servers.

With the solution of the invention, a signaling overhead and thus radio resources in a radio access network can be saved, and preferably the technical solution of the invention also shortens a period of time for a terminal equipment to wait for a feedback so that the terminal equipment can enter a dormancy status or transmit new service data as soon as possible, thereby saving power consumption of the terminal equipment.

BRIEF DESCRIPTION OF DRAWINGS

The foregoing and other features, objects and advantages of the invention will become more apparent with reference to the following detailed description of non-limiting embodiments thereof with reference to the drawings in which:

FIG. 1 illustrates a schematic structural diagram of a network of an existing communication system;

FIG. 2 illustrates a protocol stack of the existing system;

In the drawings, identical or like reference numerals represent identical or like components.

DETAILED DESCRIPTION OF EMBODIMENTS

Figure 3:
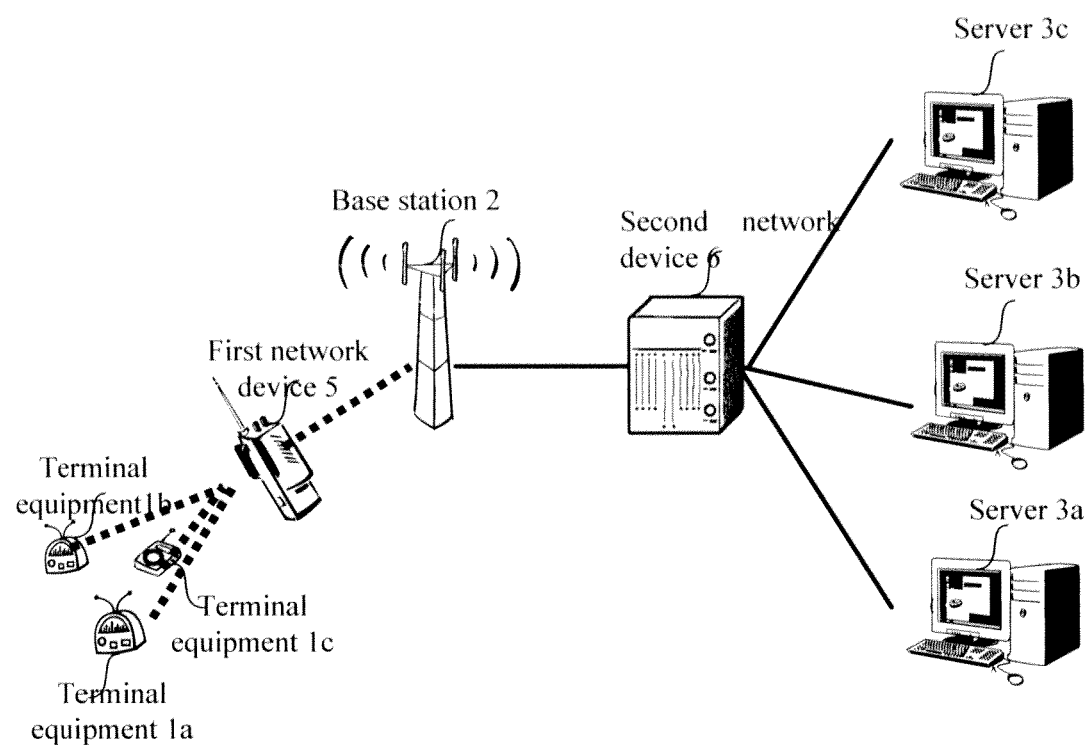
FIG. 3 illustrates a schematic structural diagram of a network topology according to an embodiment of the invention.

FIG. 3 illustrates a schematic structural diagram of a network topology according to an embodiment of the invention. The terminal equipment 1, particularly represented as terminal equipments 1a, 1b and 1c in FIG. 3, includes a Bluetooth terminal equipment, an infrared terminal equipment, a Zigbee protocol based radio terminal equipment or other 3GPP communication protocol based or non-3GPP communication protocol based radio terminal equipment. Only three terminal equipments 1a, 1b and 1c are illustrated in FIG. 3 as a non-limiting example, and the number of terminal equipments will not be limited thereto in a practical network. As compared with the schematic structural diagram of the network architecture of the existing communication system illustrated in FIG. 1, a first network device 5 and a second network device 6 are added in the schematic structural diagram of the network topology according to the embodiment of the invention illustrated in FIG. 3. Particularly the first network device 5 and the second network device 6 represent logic entities, and they can reuse gateways (GWs) in the existing network architecture, but alternatively the first network device 5 can be a terminal equipment and the second network device 6 can be a server, etc. Specifically the first network device 5 is located in a Radio Access Network (RAN) to aggregate service data from the terminal equipments 1a, 1b and 1c. The second network device 6 is located in a Core Network (CN) and an opposite entity to the first network device 5 to process a signal, forwarded by a base station 2, from the first network device 5. The second network device 6 extracts respectively non-access stratum data packets aggregated by the first network device 5 and then transmits them to a corresponding servers 3a, 3b or 3c.

Figure 4:
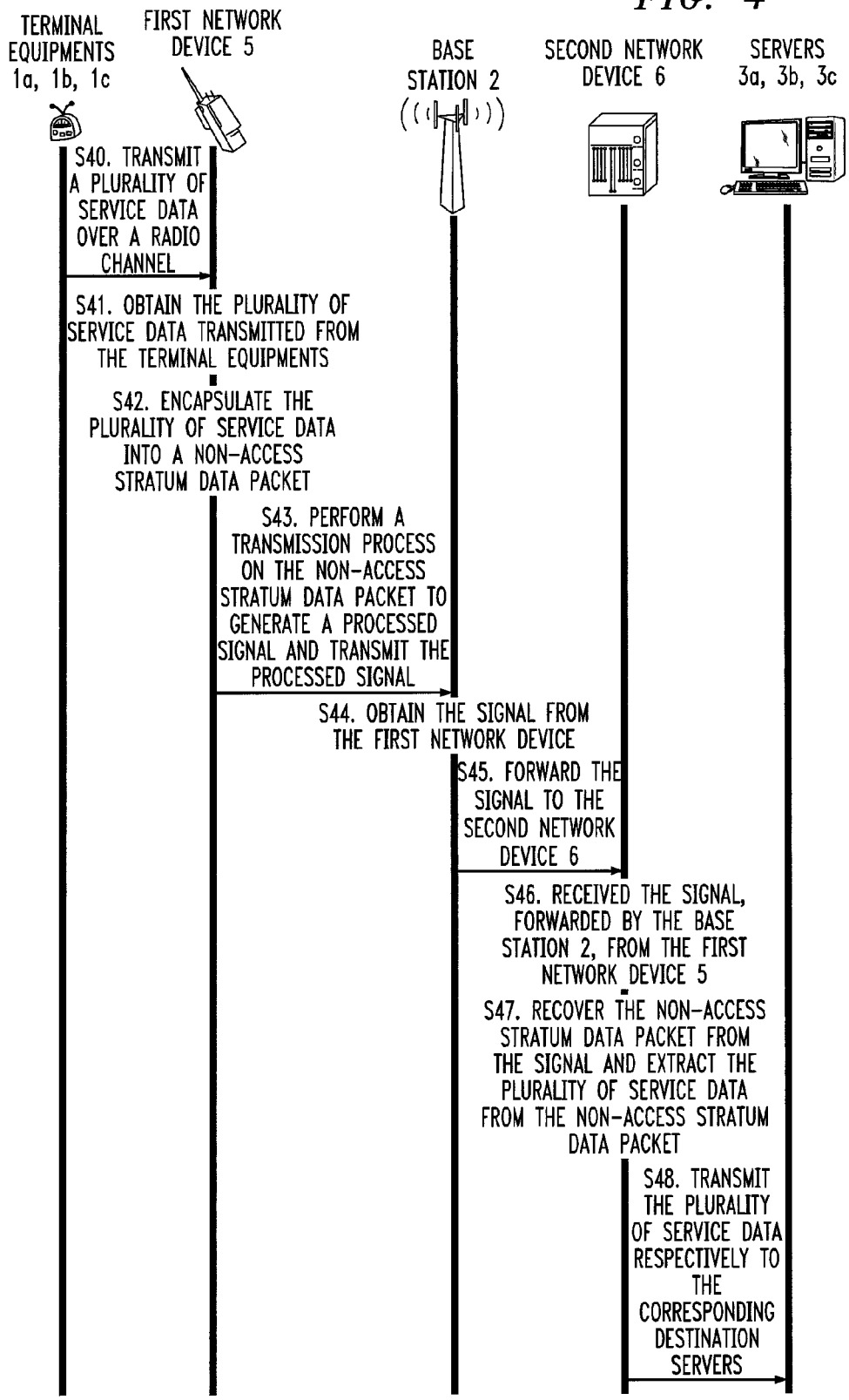
FIG. 4 illustrates a flow chart of a system method according to an embodiment of the invention.

FIG. 4 illustrates a flow chart of a system method according to an embodiment of the invention. The flow chart of the system method according to the invention will be detailed below with reference to FIG. 4 in combination with FIG. 3.

Firstly a description will be presented taking the first network device 5 serving only one terminal equipment 1a as an example. Then a description will be further presented taking the first network device 5 serving a plurality of terminal equipments 1a, 1b and 1c as an example in a variant implementation.

Firstly in the step S40, the terminal equipment 1a transmits acquired service data, e.g., temperature data, data of a gas meter, data of a fire alarm, etc., to the first network device 5 in a radio communication protocol, which can be a Bluetooth protocol, an infrared protocol, a Zigbee protocol, a 3GPP based radio communication protocol, etc.

In the step S41, the first network device 5 obtains a plurality of service data transmitted from the terminal equipment 1a, e.g., a plurality of service data, transmitted from the terminal equipment 1a, encapsulated respectively in different containers, etc., over a radio channel, in the radio protocol, that is, the protocol corresponding to the terminal equipment 1a, e.g., a Bluetooth protocol, an infrared protocol, a Zigbee protocol, a 3GPP based radio communication protocol, etc. For example, the first network device 5 can set a predetermined time duration length, e.g., a time duration sliding window, etc., and obtains a plurality of service data transmitted from the terminal equipment 1a in the range of the time duration sliding window.

Optionally the first network device 5 can also determine the number of service data from the terminal equipment 1a to be encapsulated according to the size of a data packet.

Then in the step S42, the first network device 5 encapsulates the plurality of service data transmitted from the terminal equipment 1a respectively at different moments of time into a non-access stratum data packet. The non-access stratum (NAS) is a protocol above the PDCP layer. Therefore only one procedure of signaling interaction with the network side is required for the encapsulated non-access stratum data packet, thus saving a signaling overhead. Preferably the first network device 5 can remove an upper layer header, e.g., a TCP header, etc., and a service type, a TTL and other information in the header in a data packet from the terminal equipment to further reduce redundant information in order to further save radio resources.

In a variant embodiment, after the step S41 and, for example, before the step S42, the first network device 5 transmits an ACK message to the terminal equipment 1a to notify the terminal equipment 1a about correct reception by the first network device 5 of a plurality of service data packets, and then the terminal equipment 1a can enter a dormancy status, thereby saving power of the terminal equipment; or the terminal equipment 1a can prepare for next transmission of service data, thereby shortening a period of time for waiting, instead of triggering the first network device 5 to send a feedback to the terminal equipment upon the first network device 5 receives a feedback from the base station 2.

In a variant implementation, after he step S41 and before the step S42:

The first network device 5 obtains relevant identification information of the respective service data to identify a communication party of the service data. Hereinafter at least three scenarios below of what contents the relevant identification information includes will be detailed by way of an example in which the first network device 5 serves a plurality of terminal equipments 1a, 1b and 1c and the first network device 5 receives a plurality of service data from the terminal equipments 1a, 1b and 1c in the step S41:

i) The relevant identification information includes only terminal equipment identifiers of the terminal equipments transmitting the respective service data.

The terminal equipment identifier is an identifier to identify uniquely a terminal equipment, and can be an MAC address of the terminal equipment 1a, 1b or 1c or a physical address of the terminal equipment 1a, 1b or 1c, e.g., an ex-factory device number of the terminal equipment 1a, 1b or 1c, etc., or an IP address of the terminal equipment 1a, 1b or 1c or like.

Then in the step S42, the first network device 5a encapsulates the plurality of service data from the terminal equipment 1a, 1b or 1c in the form of a list as depicted in Table 1 below:

TABLE 1

| Identifier of terminal equipment 1a | Service data A1 | Padding |
| Identifier of terminal equipment 1b | Service data B1 | Padding |
| ... | ... | ... |
| Identifier of terminal equipment 1c | Service data C1 | Padding |

When an application operating on the terminal equipment 1a, 1b or 1c is specific, that is, when the terminal equipment 1a, 1b or 1c communicates respectively with a specific application server, or in other words, when the terminal equipment identifier is binding with a destination server identifier, for example, when the first network device 5 obtains service data A1 from the terminal equipment 1a, service data B1 from the terminal equipment 1b and service data C1 from the terminal equipment 1c, the first network device 5 can encapsulate the plurality of service data by including only the terminal equipment identifiers of the terminal equipments but not identification information of any destination server into a non-access stratum data packet.

"Padding" depicted in Table 1 is not required, but a padding bit(s) will be required for byte alignment only if bits occupied by the identifier of the terminal equipment and the service data are not a complete byte.

ii) The relevant identification information includes only server identifiers of destination servers of the respective service data.

When an application operating on the terminal equipment 1a, 1b or 1c is specific, that is, when the terminal equipment 1a, 1b or 1c communicates with a specific application server and the terminal equipment identifier is binding with a destination server identifier, for example, when the first network device 5 obtains service data A2 from the terminal equipment 1a, service data B2 from the terminal equipment 1b and service data C2 from the terminal equipment 1c, the first network device 5 can alike include only server identifiers of destination servers of the terminal equipments, that is, only identifiers of destination servers 3a, 3b and 3c but not the transmitters of the service data, i.e., the identifiers of the source terminal equipments, as depicted in Table 2, into a non-access stratum data packet. As depicted in Table 2 below:

TABLE 2

| Identifier of server 3a | Service data A2 | Padding |
| Identifier of server 3b | Service data B2 | Padding |
| ... | ... | ... |
| Identifier of server 3c | Service data C2 | Padding | iii) The relevant identification information includes both terminal equipment identifiers of the terminal equipments transmitting the respective service data and server identifiers of destination servers of the respective service data. As depicted in Table 3 below:

TABLE 3

| Identifier of terminal equipment 1a | Identifier of server 3a | Service data A3 | Padding |
| Identifier of terminal equipment 1b | Identifier of server 3b | Service data B3 | Padding |
| ... | ... | ... | ... |
| Identifier of terminal equipment 1c | Identifier of server 3b | Service data C3 | Padding |

When an application operating on the terminal equipment 1a, 1b or 1c is unspecific, that is, when a plurality of application programs can operate respectively on the terminal equipment 1a, 1b or 1c and the terminal equipment 1a may communicate with a plurality of application servers, the terminal equipment 1b may communicate with a plurality of application servers or the terminal equipment 1c may communicate with a plurality of application servers, that is to say, when the terminal equipment identifier is not binding with any destination server identifier, the first network device 5 encapsulates the plurality of service data by including both the terminal equipment identifiers of the terminal equipments and identifiers of destination servers of the service data into a non-access stratum data packet.

For example, the terminal equipment 1*a* may communicate respectively with the servers 3*a*, 3*b* and 3*c*, the terminal equipment 1*b* may communicate respectively with the servers 3*a* and 3*b*, and the terminal equipment 1*c* may communicate respectively with the servers 3*b* and 3*c*, that is, the terminal equipments are not in one-to-one correspondence to the servers. At this time when the first network device 5 obtains the service data A3 transmitted from the terminal equipment 1*a* to the server 3*a*, and the service data B3 transmitted from terminal equipment 1*b* to the server 3*b* and the service data C3 transmitted to the server 1*b*. Therefore in the step S42, the fist network device 5 encapsulates all the identifiers 1*a*, 1*b* and 1*c* of the terminal equipments, the plurality of service data and the server identifiers 3*a*, 3*b* and 3*c* of the destination servers corresponding to the respective service data correspondingly into a non-access stratum data packet.

As compared with the terminal equipments 1*a*, 1*b* and 1*c* which have to perform a procedure of signaling interaction respectively with the base station 2 and even the core network in order to transmit the service data A1 (or A2, A3), the service data B1 (or B2, B3) or the service data C1 (or C2, C3) in the prior art, the first network device 5 transmits A1, B1 and C1 (A2, B2 and C2 or A3, B3 and C3) concurrently by establishing only one signaling communication procedure in the solution of the invention, thereby saving a signaling overhead.

The description has been given above taking the first network device 5 serving a plurality of terminal equipments 1*a*, 1*b* and 1*c* as an example. Those skilled in the art shall appreciate that the foregoing encapsulation formats of a non-access stratum data packet can also be applicable to a scenario in which the first network device 5 serves only one terminal equipment.

Then in the step S43, the first network device 5 performs a transmission process on the non-access stratum data packet to generate a processed signal and transmits the processed signal.

Specifically there are at least three specific implementations below for the transmission process:

I) An existing uplink access scheme

After the first network device 5 is synchronized with the network, receives a cell broadcast channel and searches for a cell, it then camps on a target cell, initiates a call request and establishes a Radio Resource Control (RRC) connection. The RRC connection is required not only for communication but also for procedures of updating a location, registering a routing zone, etc. Access signaling transmitted over a Random Access Channel (PRACH) is divided into two portions, i.e., a preamble portion and a message portion. When the RRC connection is initiated, the first network device 5 will initiate open-loop power control in the uplink, which is performed with the preamble. Therefore the preamble over the PRACH is for the purpose of open-loop power control. The preamble is a sequence generated at the physical layer, and the first network device 5 will transmit tentatively the preamble at initial power $P_0$ until there is a response in the downlink and then transmit the message portion instead of the preamble. Since the preamble is a message sequence at the physical layer, a response channel available in the downlink direction shall also be a purely physical channel referred to as an Acquisition Indicator Channel (AICH) in the DL direction. Therefore the preamble and the AICH are paired for the purpose of allowing an access of a user. When an ACK response is made over the AICH, the first network device 5 obtains an initial power value $P_1$ of message transmission, and the base station 2 allows the first network device 5 to transmit a random access request message, i.e., an RRC access request message, at power $P_1$. That is, the first network device 5 transmits an RRC request message to the base station 2, then the base station 2 further transmits an RRC ACK message to the first network device 5, the first network device 5 further transmits NAS signaling to the core network (including the servers 3*a*, 3*b* and 3*c*) for authentication, and the servers 3*a*, 3*b* and 3*c* further transmits NAS response signaling to the first network device 5 upon successful authentication. After signaling interaction, the first network device 5 begins to transmit to the base station 2 a signal generated from the non-access stratum data packet, generated in the step S42, generated after MAC layer and physical layer processes.

In the foregoing access implementation I), the first network device firstly performs signaling interaction with the base station and then transmits the NAS data packet. In order to further save radio resources, the service data and the control signaling can be transmitted jointly, that is, the NAS data packet and the control signaling is transmitted over the same physical channel, as described in the following implementations II) and III).

Figure 5:
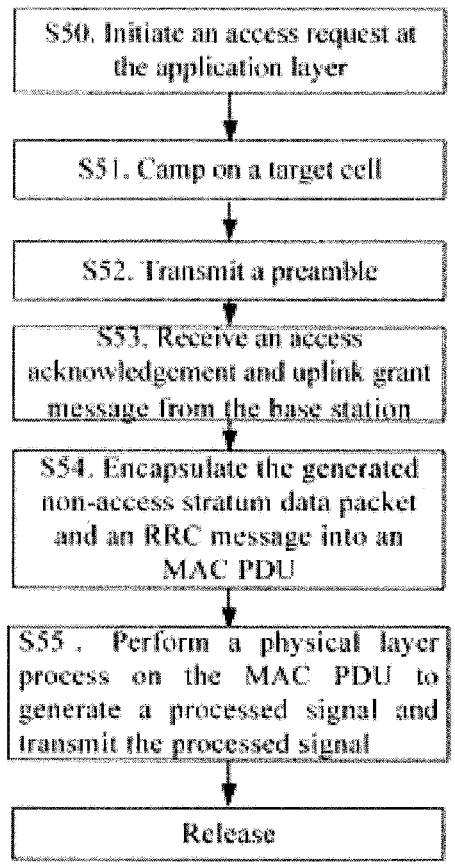
FIG. 5 illustrates an access procedure of an NAS data packet of the first network device 5 according to an embodiment of the invention.

Specifically in the implementation II), the first network device 5 compresses the service data and RRC control signaling together for transmission, that is:

II) The NAS data packet and a radio resource control signaling message are encapsulated together into an MAC PDU for joint transmission:

FIG. 5 illustrates an access procedure of an NAS data packet of the first network device 5 according to an embodiment of the invention. In the step S50, an access request is initiated at the application layer of the first network device 5. Then in the step S51, the first network device 5 receives a cell broadcast channel and searches for a cell and then camps on a target cell. Then in the step S52, the first network device 5 transmits a preamble. Then in the step S53, the first network device 5 receives an access acknowledgment (ACK) and uplink (UL) grant message from the base station. Then in the step S54, the first network device 5 encapsulates the non-access stratum data packet generated in the step S42 and an RRC message together into a Media Access Control Protocol Data Unit (MAC PDU). Specifically the first network device 5 generates and then encapsulates an RRC request message into an RLC PDU and then encapsulates the RLC PDU and an NAS PDU of the service data together into an MAC PDU; and then in the step S55, the first network device 5 performs a physical layer process on the media access control protocol data unit to generate a processed signal and transmits the processed signal.

Furthermore the first network device 5 can alternatively transmit jointly the NAS data packet and a preamble together when there is a low amount of data of the NAS data packet. That is:

III) The non-access layer data packet generated in the step S42 is transmitted over a resource allocated for transmission of a preamble after the preamble is transmitted.

Figure 6:
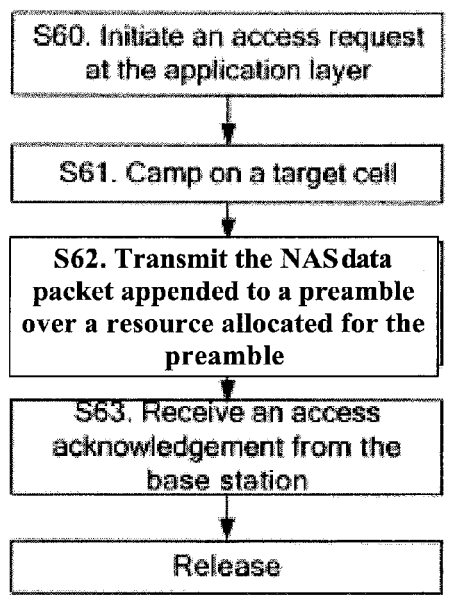
FIG. 6 illustrates an access procedure of an NAS data packet of the first network device 5 according to another embodiment of the invention.

FIG. 6 illustrates an access procedure of an NAS data packet of the first network device 5 according to another embodiment of the invention. Specifically in the step 560 as illustrated in FIG. 6, an access request is initiated at the application layer of the first network device 5. Then in the step S61, the first network device 5 receives a cell broadcast channel and searches for a cell and then camps on a target cell. Then in the step S62, the first network device 5 transmits the NAS data packet, generated in the step S42, appended to a preamble over a resource allocated for the preamble. The preamble is configured to specifically control an access of the terminal equipment 1a, 1b or 1c, i.e., an M2M terminal equipment.

In view of a limited resource allocated for the preamble and also a limited amount of data that can be appended to the preamble for transmission, the first network device 5 therefore may optionally skip the process of the step S42 but directly transmit the data from the terminal equipments over the resource allocated for the preamble. For example, the terminal equipment 1a collects information of a gas alarm. When the first network device receives alarm information "1" from the terminal equipment 1a, which indicates occurrence of gas leakage, the first network device 5 directly encodes the alarm information, for example, through Cyclic Redundancy Coding (CRC), etc., and transmits a preamble and the encoded data together, where the preamble is allocated specifically for an M2M terminal equipment.

Referring back to FIG. 4, after the first network device 5 transmits the signal including the service data, the base station 2 obtains the signal from the first network device 5 correspondingly in the step S44, where the signal includes the plurality of service data, transmitted from the terminal equipments over the radio channel, encapsulated into a non-access stratum data packet; and then in the step S45, the base station 2 forwards the signal to the second network device 6.

In a variant implementation, after the step S44 and, for example, before the step S45, the base station 2 terminates the session, that is, transmits an ACK message to the first network device 5.

In the step S46, the second network device 6 receives the signal, forwarded by the base station 2, from the first network device 5, where the signal includes the plurality of service data, transmitted from the one or more terminal equipments to the one or more corresponding destination servers over the radio channel, encapsulated in the non-access stratum data packet.

Then in the step S47, the non-access stratum data packet is recovered from the signal, and the plurality of service data are extracted from the non-access stratum data packet. Specifically when the service data is accessed as described in the specific implementation II), the second network device 6 knows the starting location of the NAS data packet according to information of a header in the MAC layer data packet, e.g., the starting bit of the MAC SDU in which the NAS PDU is encapsulated, etc., and thus extracts the NAS PDU from the MAC PDU. If the NAS PDU includes neither terminal equipment identifier nor server identifier, for example, the first network device serves only one terminal equipment, e.g., the terminal equipment 1a, etc., and the terminal equipment 1a communicates only with the server 3a, that is, the terminal equipment 1a is binding with the server 3a, when the first network device 5 transmits the data packet with the identifier of the first network device 5 appended thereto, then the second network device 6 knows from the identifier of the first network device 5 that the data packet is destined for the server 3a. Then in the step S48, the second network device 6 transmits the plurality of service data to the corresponding destination server 3a.

In a variant implementation, when the first network device serves a plurality of terminal equipments, e.g., the terminal equipments 1a, 1b and 1c, the NAS data packet included in the signal received by the second network device 6 may be encapsulated as in any scheme of i), ii) or iii), each of which will be detailed respectively as follows:

In the encapsulation scheme i), the second network device 6 is located in the core network 4. Typically a correspondence relationship between the terminal equipments and the servers exists in the core network 4, that is, the core network 4 knows a specific server or servers with which a terminal equipment communicates. Therefore after the second network device 6 obtains the identifiers of the terminal equipments as depicted in Table 1, the second network device 6 knows from the correspondence relationship between the terminal equipments and the servers, which is pre-stored or which is retrieved from other network device, e.g., a database, etc., of the core network 4, that the terminal equipment 1a corresponds to the server 3a, the terminal equipment 1b corresponds to the server 3b and the terminal equipment 1c corresponds to the server 3c, then in the step S48, the second network device 6 transmits the service data A1 to the server 3a, the service data B1 to the server 3b and the service data C1 to the server 3c.

Optionally when the second network device 6 obtains the data packet encapsulated in the encapsulation scheme as depicted in Table 2 (corresponding to the scenario ii)), the second network device 6 correspondingly transmits the service data A2 to the server 3a, the service data B2 to the server 3b and the service data C2 to the server 3c.

Furthermore if the second network device 6 obtains the data packet encapsulated in the encapsulation scheme as depicted in Table 3 (corresponding to the scenario iii)), then the second network device 6 directly transmits the service data A3 to the server 3a, the service data B3 to the server 3b and the service data C3 to the server 3c.

The second network device 6 receives a signal that the NAS data packet and RRC signaling is encapsulated into one MAC PDU, as described in the foregoing specific implementations, and furthermore when the service data packet is accessed as described in the specific implementation III), that is, the NAS data packet is appended to a preamble for transmission, the second network device 6 knows from a special pattern of the preamble that the NAS data packet of the service data of the terminal equipment, e.g., the terminal equipment 1a, etc., is further appended to the preamble, the second network device 6 knows the starting location of the NAS data packet, e.g., the starting bit of the NAS PDU, etc., and thereby extracts the NAS PDU and then further extracts and transmits the specific service data in the NAS PDU to the corresponding servers.

In a variant implementation, after the step S48, when the second network device 6 receives an ACK message from the server 3a, 3b or 3c to terminate the session, which indicates correct reception by the server of the service data, the second network device 6 further transmits a session termination instruction message to the base station 2, that is, transmits an ACK message to the base station 2.

Figure 7:
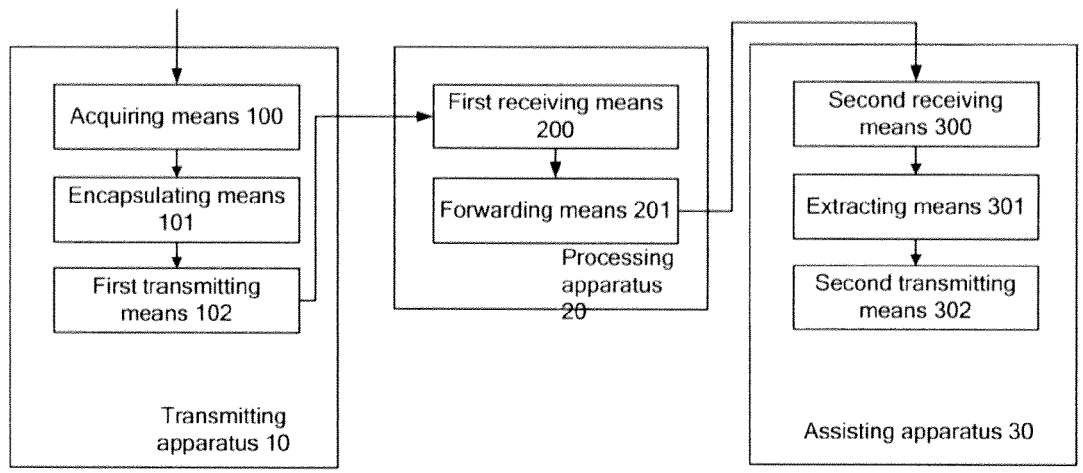
FIG. 7 illustrates a block diagram of a device according to an embodiment of the invention.

FIG. 7 illustrates a block diagram of a device according to an embodiment of the invention. The block diagram of the device according to the invention will be detailed below with reference to FIG. 7 in combination with FIG. 3.

A transmitting apparatus 10 in FIG. 7 is located in the first network device 5 and includes an obtaining means 100, an encapsulating means 101 and a first transmitting means 102. A processing apparatus 20 is located in the base station 2 and includes a first receiving means 200 and a forwarding means 201. An assisting apparatus 30 is located in the second network device 6 and includes a second receiving means 300, an extracting means 301 and a second transmitting means 302.

Firstly a description will be presented taking the first network device 5 serving only one terminal equipment 1a as an example. Then a description will be further presented taking the first network device 5 serving a plurality of terminal equipments 1a, 1b and 1c as an example in a variant implementation.

Firstly the terminal equipment 1a transmits acquired service data, e.g., temperature data, data of a gas meter, data of a fire alarm, etc., to the first network device 5 in a radio communication protocol, which can be a Bluetooth protocol, an infrared protocol, a Zigbee protocol, a 3GPP based radio communication protocol, etc.

Then the obtaining means 100 of the first network device 5 obtains a plurality of service data transmitted from the terminal equipment 1a, e.g., a plurality of service data, transmitted from the terminal equipment 1a, encapsulated respectively in different containers, etc., over a radio channel, in the radio protocol, that is, the protocol corresponding to the terminal equipment 1a, e.g., a Bluetooth protocol, an infrared protocol, a Zigbee protocol, a 3GPP based radio communication protocol, etc. For example, the obtaining means 100 can set a predetermined time duration length, e.g., a time duration sliding window, etc., and obtains a plurality of service data transmitted from the time duration equipment 1a in the range of the temporal sliding window.

Optionally the first network device 5 can also determine the number of service data from the terminal equipment 1a to be encapsulated according to the size of a data packet.

Then the encapsulating means 101 of the first network device 5 encapsulates the plurality of service data transmitted from the terminal equipment 1a respectively at different moments of time into a non-access stratum data packet. The non-access stratum (NAS) is a protocol above the PDCP layer. Therefore only one procedure of signaling interaction with the network side is required for the encapsulated non-access stratum data packet, thus saving a signaling overhead. Preferably the encapsulating means 101 can remove an upper layer header, e.g., a TCP header, etc., and a service type, a TTL and other information in the header in a data packet from the terminal equipment to further reduce redundant information in order to further save radio resources.

In a variant embodiment, after the obtaining means 100 receives correctly the plurality of service data from the terminal equipment 1a, the first network device 5 transmits an ACK message to the terminal equipment 1a to notify the terminal equipment 1a about correct reception by the first network device 5 of a plurality of service data packets, and then the terminal equipment 1a can enter a dormancy status, thereby saving power of the terminal equipment; or the terminal equipment 1a can prepare for next transmission of service data, thereby shortening a period of time for waiting.

In a variant implementation, the obtaining means 100 is further configured to obtain relevant identification information of the respective service data to identify a communication party of the service data. Hereinafter at least three scenarios below of what contents the relevant identification information includes will be detailed by way of an example in which the first network device 5 serves a plurality of terminal equipments 1a, 1b and 1c and the first network device 5 receives a plurality of service data from the terminal equipments 1a, 1b and 1c in the step S41:

i) The relevant identification information includes only terminal equipment identifiers of the terminal equipments transmitting the respective service data.

The terminal equipment identifier is an identifier to identify uniquely a terminal equipment and can be an MAC address of the terminal equipment 1a, 1b or 1c or a physical address of the terminal equipment 1a, 1b or 1c, e.g., an ex-factory device number of the terminal equipment 1a, 1b or 1c, etc., or an IP address of the terminal equipment 1a, 1b or 1c or like.

Then the encapsulating means 101 encapsulates the plurality of service data from the terminal equipment 1a, 1b or 1c in the form of a list as depicted in Table 1.

When an application operating on the terminal equipment 1a, 1b or 1c is specific, that is, when the terminal equipment 1a, 1b or 1c communicates respectively with a specific application server, or in other words, when the terminal equipment identifier is binding with a destination server identifier, for example, when the obtaining means 100 obtains service data A1 from the terminal equipment 1a, service data B1 from the terminal equipment 1b and service data C1 from the terminal equipment 1c, and the encapsulating means 101 can encapsulate the plurality of service data by including only the terminal equipment identifiers of the terminal equipments but not identification information of any destination server into a non-access stratum data packet.

"Padding" depicted in Table 1 is not required, but a padding bit(s) will be required for byte alignment only if hits occupied by the identifier of the terminal equipment and the service data are not a complete byte.

ii) The relevant identification information includes only server identifiers of destination servers of the respective service data.

When an application operating on the terminal equipment 1a, 1b or 1c is specific, that is, when the terminal equipment communicates with a specific application server and the terminal equipment identifier is binding with a destination server identifier, for example, when the obtaining means 100 obtains service data A2 from the terminal equipment 1a, service data B2 from the terminal equipment 1b and service data C2 from the terminal equipment 1c, and the encapsulating means 101 can alike include only server identifiers of destination servers of the terminal equipments, that is, only identifiers of destination servers 3a, 3b and 3c but not the transmitters of the service data, i.e., the identifiers of the source terminal equipments, as depicted in Table 2, in an encapsulated-into non-access stratum data packet.

iii) The relevant identification information includes both terminal equipment identifiers of the terminal equipments transmitting the respective service data and server identifiers of destination servers of the respective service data. As depicted in Table 3 above. When an application operating on the terminal equipment 1a, 1b or 1c is unspecific, that is, when a plurality of application programs can operate respectively on the terminal equipment 1a, 1b or 1c and the terminal equipment 1a may communicate with a plurality of application servers, the terminal equipment 1b may communicate with a plurality of application servers or the terminal equipment 1c may communicate with a plurality of application servers, that is to say, when the terminal equipment identifier is not binding with any destination server identifier, the encapsulating means 101 encapsulates the plurality of service data by including both the terminal equipment identifiers of the terminal equipments and identifiers of destination servers of the service data into a non-access stratum data packet.

For example, the terminal equipment 1a may communicate respectively with the servers 3a, 3b and 3c, the terminal equipment 1b may communicate respectively with the servers 3a and 3b, and the terminal equipment 1c may communicate respectively with the servers 3b and 3c, that is, the terminal equipments are not in one-to-one correspondence to the servers. At this time when the obtaining means 100 obtains the service data A3 transmitted from the terminal equipment 1a to the server 3a, and the service data B3 transmitted from the terminal equipment 1b to the server 3b and the service data C3 transmitted to the server 1b. Therefore, the encapsulating means 101 encapsulates the identifiers 1a, 1b and 1c of the terminal equipments, the plurality of service data and the server identifiers 3a, 3b and 3c of the destination servers corresponding to the respective service data correspondingly into a non-access stratum data packet.

As compared with the terminal equipments 1a, 1b and 1c which have to perform a procedure of signaling interaction respectively with the base station 2 and even the core network in order to transmit the service data A1 (or A2, A3), the service data B1 (or B2, B3) or the service data C1 (or C2, C3) in the prior art, the first network device 5 transmits A1, B1 and C1 (A2, B2 and C2 or A3, B3 and C3) concurrently by establishing only one signaling communication procedure in the solution of the invention, thereby saving a signaling overhead.

The description has been given above taking the first network device 5 serving a plurality of terminal equipments 1a, 1b and 1c as an example. Those skilled in the art shall appreciate that the foregoing encapsulation formats of a non-access stratum data packet can also be applicable to a scenario in which the first network device 5 serves only one terminal equipment.

Then the processing means 102 performs a transmission process on the non-access stratum data packet to generate a processed signal and transmits the processed signal.

Specifically there are at least three specific implementations below for the transmission process:

IV) An existing uplink access scheme

After the first network device 5 is synchronized with the network, receives a cell broadcast channel and searches for a cell, it then camps on a target cell, initiates a call request and establishes a Radio Resource Control (RRC) connection. The RRC connection is required not only for communication but also for procedures of updating a location, registering a routing zone, etc. Access signaling transmitted over a Random Access Channel (PRACH) is divided into two portions, i.e., a preamble portion and a message portion. When the RRC connection is initiated, the first network device 5 will initiate open-loop power control in the uplink, which is performed with the preamble. Therefore the preamble over the PRACH is for the purpose of open-loop power control. The preamble is a sequence generated at the physical layer, and the first network device 5 will transmit tentatively the preamble at initial power $P_0$ until there is a response in the downlink and then transmit the message portion instead of the preamble. Since the preamble is a message sequence at the physical layer, a response channel available in the downlink direction shall also be a purely physical channel referred to as an Acquisition Indicator Channel (AICH) in the DL direction. Therefore the preamble and the AICH are paired for the purpose of allowing an access of a user. When an ACK response is made over the AICH, the first network device 5 obtains an initial power value $P_1$ of message transmission, and the base station 2 allows the first network device 5 to transmit a random access request message, i.e., an RRC access request message, at power $P_1$. That is, the first transmitting means 102 transmits an RRC request message to the base station 2, then the base station 2 further transmits an RRC ACK message to the first network device 5, the first network device 5 further transmits NAS signaling to the core network (including the servers 3a, 3b and 3c) for authentication, and the servers 3a, 3b and 3c further transmits NAS response signaling to the first network device 5 upon successful authentication. After signaling interaction, the first transmitting means 102 begins to transmit to the base station 2 a signal generated from the non-access stratum data packet, generated by the encapsulating means 101, generated after MAC layer and physical layer processes.

In the foregoing access implementation IV), the first network device firstly performs signaling interaction with the base station and then transmits the NAS data packet. In order to further save radio resources, the service data and the control signaling can be transmitted jointly, that is, the NAS data packet and the control signaling is transmitted over the same physical channel, as described in the following implementations V) and VI).

Specifically in the implementation V), the first network device 5 compresses the service data and RRC control signaling together for transmission, that is:

V) The NAS data packet and a radio resource control signaling message are encapsulated together into an MAC PDU for joint transmission:

Reference is made to FIG. 5 illustrating an access procedure of an NAS data packet of the first network device 5 according to an embodiment of the invention. An access request is initiated at the application layer of the first network device 5. Then the first network device 5 receives a cell broadcast channel and searches for a cell and then camps on a target cell. Then the first network device 5 transmits a preamble. Then in the step S53, the first network device 5 receives an access acknowledgment (ACK) and uplink (UL) grant message from the base station. Then the first transmitting means 102 encapsulates the non-access stratum data packet generated by the encapsulating means 101 and an RRC message together into a Media Access Control Protocol Data Unit (MAC PDU). Specifically the first network device 5 generates and then encapsulates an RRC request message into an RLC PDU and then encapsulates the RLC PDU and an NAS PDU of the service data together into an MAC PDU; and then the first transmitting means 102 performs a physical layer process on the media access control protocol data unit to generate a processed signal and transmits the processed signal.

Furthermore the first transmitting means 102 can alternatively transmit jointly the NAS data packet and a preamble together when there is a low amount of data of the NAS data packet. That is:

VI) The non-access layer data packet generated in the step S42 is transmitted over a resource allocated for transmission of a preamble after the preamble is transmitted.

Reference is made to FIG. 6 illustrating an access procedure of an NAS data packet of the first network device 5 according to another embodiment of the invention. Specifically as illustrated in FIG. 6, an access request is initiated at the application layer of the first network device 5. Then the first network device 5 receives a cell broadcast channel and searches for a cell and then camps on a target cell. Then the first transmitting means 102 transmits the NAS data packet, generated by the encapsulating means 101, appended to a preamble over a resource allocated for the preamble. The preamble is configured to specifically control an access of the terminal equipment 1a, 1b or 1c, i.e., an M2M terminal equipment.

In view of a limited resource allocated for the preamble and also a limited amount of data that can be appended to the preamble for transmission, the first network device 5 therefore may optionally skip the process of the encapsulating means 101 but directly transmit the data from the terminal equipments over the resource allocated for the preamble. For example, the terminal equipment 1a collects information of a gas alarm. When the first network device receives alarm information "1" from the terminal equipment 1a, which indicates occurrence of gas leakage, the first network device 5 directly encodes the alarm information, for example, through Cyclic Redundancy Coding (CRC), etc., and transmits a preamble and the encoded data together, where the preamble is allocated specifically for an M2M terminal equipment.

Further referring to FIG. 7, after the first transmitting means 102 transmits the signal including the service data, the first receiving means 200 correspondingly obtains the signal from the first network device 5, where the signal includes the plurality of service data, transmitted from the terminal equipments over the radio channel, encapsulated into a non-access stratum data packet; and then the forwarding means 201 forwards the signal to the second network device 6.

The second receiving means 300 in the assisting apparatus 30 receives the signal, forwarded by the forwarding means 201, from the first network device 5, where the signal includes the plurality of service data, transmitted from the one or more terminal equipments to the one or more corresponding destination servers over the radio channel, encapsulated in the non-access stratum data packet.

Then the extracting means 301 recovers the non-access stratum data packet from the signal and extracts the plurality of service data from the non-access stratum data packet. Specifically when the service data is accessed as described in the specific implementation VI), the extracting means 301 knows the starting location of the NAS data packet according to information of a header in the MAC layer data packet, e.g., the starting bit of the MAC SDU in which the NAS PDU is encapsulated, etc., and thus extracts the NAS PDU from the MAC PDU. If the NAS PDU includes neither terminal equipment identifier nor server identifier, for example, the first network device serves only one terminal equipment, e.g., the terminal equipment 1a, etc., and the terminal equipment 1a communicates only with the server 3a, that is, the terminal equipment 1a is binding with the server 3a, when the first network device 5 transmits the data packet with the identifier of the first network device 5 appended thereto, then the extracting means 301 knows from the identifier of the first network device 5 that the data packet is destined for the server 3a. Then in the step S48, the second network device 6 transmits the plurality of service data to the corresponding destination server 3a.

In a variant implementation, when the first network device serves a plurality of terminal equipments, e.g., the terminal equipments 1a, 1b and 1c, the NAS data packet included in the signal received by the second network device 6 may be encapsulated as in any scheme of i), ii) or iii), each of which will be detailed respectively as follows:

In the encapsulation scheme i), the second network device 6 is located in the core network 4. Typically a correspondence relationship between the terminal equipments and the servers exists in the core network 4, that is, the core network 4 knows a specific server or servers with which a terminal equipment communicates. Therefore after the extracting means 301 obtains the identifiers of the terminal equipments as depicted in Table 1, the extracting means 301 knows from the correspondence relationship between the terminal equipments and the servers, which is pre-stored or which is retrieved from other network device, e.g., a database, etc., of the core network 4, that the terminal equipment 1a corresponds to the server 3a, the terminal equipment 1b corresponds to the server 3b and the terminal equipment 1c corresponds to the server 3c, then the second transmitting means 302 transmits the service data A1 to the server 3a, the service data B1 to the server 3b and the service data C1 to the server 3c.

Optionally when the second network device 6 obtains the data packet encapsulated in the encapsulation scheme as depicted in Table 2 (corresponding to the scenario ii)), the second transmitting means 302 correspondingly transmits the service data A2 to the server 3a, the service data B2 to the server 3b and the service data C2 to the server 3c.

Furthermore if the second network device 6 obtains the data packet encapsulated in the encapsulation scheme as depicted in Table 3 (corresponding to the scenario iii)), then the second transmitting means 302 directly transmits the service data A3 to the server 3a, the service data B3 to the server 3b and the service data C3 to the server 3c.

The second receiving means 300 receives a signal that the NAS data packet and RRC signaling is encapsulated into one MAC PDU, as described in the foregoing specific implementations, and furthermore when the service data packet is accessed as described in the specific implementation III), that is, the NAS data packet is appended to a preamble for transmission, the second network device 6 knows from a special pattern of the preamble that the NAS data packet of the service data of the terminal equipment, e.g., the terminal equipment 1a, etc., is further appended to the preamble, the second network device 6 knows the starting location of the NAS data packet, e.g., the starting hit of the NAS PDU, etc., and thereby extracts the NAS PDU and then further extracts and transmits the specific service data in the NAS PDU to the corresponding servers.

Although the invention has been explained and described in details in the drawings and the foregoing description, it shall be appreciated that the explanation and the description are illustrative and exemplary but not limiting, and the invention will not be limited to the foregoing embodiments.

Those ordinarily skilled in the art can understand and make other variations to the disclosed embodiments when studying the description, the disclosure and the drawings as well as the appended claims. In the claims, the term "comprise" will not preclude another element(s) or step(s), and the term "a/an" will not preclude plural. An element may perform functions of a plurality of technical features recited in a claim in a practical application of the invention. Any reference numeral in the claims shall not be construed as limiting the scope of the invention.

The invention claimed is:

1. A method for transmitting data in a first network device of a radio network, comprising:
    obtaining a plurality of service data from one or more terminal equipments over a radio channel;
    encapsulating the plurality of service data into a non-access stratum data packet;
    generating a radio resource control signaling message;
    performing a transmission process on the non-access stratum data packet to generate a processed signal and transmitting the processed signal, the transmission process including:
        encapsulating the non-access stratum data packet and the radio resource control signaling message together into a media access control layer data packet; and
        performing a physical layer process on the media access control layer data packet to generate the processed signal and transmitting the processed signal.

2. The method according to claim 1, wherein one or more preamble symbols are configured to control an access of the one or more terminal equipments, and
    performing a transmission process on the non-access stratum data packet to generate a processed signal and transmitting the processed signal is performed by:
    transmitting the non-access stratum data packet over a resource allocated for the preamble or preambles after transmitting the preamble or preambles.

3. The method according to claim 1, further comprising the following step after obtaining a plurality of service data from one or more terminal equipments over a radio channel and before encapsulating the plurality of service data into a non-access stratum data packet:
obtaining relevant identification information of the respective service data according to the plurality of service data, wherein the relevant identification information identifies a communication party or parties of the service data; and
encapsulating the plurality of service data into a non-access stratum data packet further includes:
encapsulating the plurality of service data and the relevant identification information corresponding to the respective service data together into the non-access stratum data packet.

4. The method according to claim 3, wherein the relevant identification information comprises a terminal equipment identifier or identifiers of the terminal equipment or equipments transmitting the respective service data and a service identifier or identifiers of a destination server or servers of the respective service data.

5. The method according to claim 1, further comprising, after obtaining a plurality of service data from one or more terminal equipments over a radio channel:
transmitting a reception acknowledgment message to the terminal equipment or equipments.

6. A method, for forwarding data from a first network device, in a base station of a radio network, comprising:
receiving a signal from the first network device, wherein the signal comprises a plurality of service data encapsulated in a non-access stratum data packet, the non-access stratum data packet being encapsulated together with a radio resource control signal message into a media access control layer data packet, the media access control layer data packet undergoing a physical layer process to generate a processed signal; and
forwarding the signal to a second network device.

7. The method according to claim 6, further comprising, after receiving a signal from the first network device, wherein the signal comprises a plurality of service data, transmitted from one or more terminal equipments over a radio channel, encapsulated in a non-access stratum data packet:
transmitting a reception acknowledgment message to the first network device.

8. A method, for assisting a first network device in transmitting data, in a second network device of a radio network, wherein the first network device is configured to encapsulate a plurality of service data from one or more terminal equipments into a non-access stratum data packet and to transmit a signal generated by processing the non-access stratum data packet to a base station, and the method comprising:
receiving the signal, from the first network device, forwarded by the base station, wherein the signal comprises a plurality of service data, encapsulated in the non-access stratum data packet, transmitted from the one or more terminal equipments to one or more corresponding destination servers over a radio channel;
recovering the non-access stratum data packet from the signal and extracting the plurality of service data from the non-access stratum data packet; and
transmitting the plurality of service data respectively to the corresponding destination server or servers.

9. The method according to claim 8, wherein the second network device comprises a correspondence relationship between the terminal equipment or equipments and the destination server or servers, and recovering the non-access stratum data packet from the signal and extracting the plurality of service data from the non-access stratum data packet further comprises:
recovering the non-access stratum data packet from the signal and obtaining relevant identification information of the respective service data according to the non-access stratum data packet, wherein the relevant identification information comprises terminal equipment identifier or identifiers of the terminal equipment or equipments transmitting the respective service data;
the method further comprises, after recovering the non-access stratum data packet from the signal and extracting the plurality of service data from the non-access stratum data packet and before transmitting the plurality of service data respectively to the corresponding destination server or servers:
determining the destination server or servers corresponding to the terminal equipment or equipments according to the terminal equipment identifier or identifiers of the respective service data; and
transmitting the plurality of service data respectively to the corresponding destination server or servers further comprises:
transmitting the plurality of service data respectively to the determined corresponding destination server or servers.

10. The method according to claim 8, wherein recovering the non-access stratum data packet from the signal and extracting the plurality of service data from the non-access stratum data packet further comprises:
recovering the non-access stratum data packet from the signal and obtaining relevant identification information of the respective service data according to the non-access stratum data packet, wherein the relevant identification information further comprises a server identifier or identifiers of the destination server or servers corresponding to the respective service data, and
transmitting the plurality of service data respectively to the corresponding destination server or servers further comprises:
transmitting the plurality of service data respectively to the obtained corresponding destination server or servers.

11. A transmitting apparatus for transmitting data in a first network device of a radio network, comprising:
a processor configured to obtain a plurality of service data from one or more terminal equipments over a radio channel;
a processor configured to encapsulate the plurality of service data into a non-access stratum data packet and further encapsulate the non-access stratum data packet, together with a radio resource control signal, into a media access control layer data packet; and
a first transmitter configured to perform a physical layer process on the media access control layer data packet to generate a processed signal and transmit the processed signal.

12. A processing apparatus, for forwarding data from a first network device, in a base station of a radio network, comprising:
a first receiver configured to receive a signal from the first network device, wherein the signal comprises a plurality of service data encapsulated in a non-access stratum data packet, the non-access stratum data packet being encapsulated together with a radio resource control signal message into a media access control layer data packet, the media access control layer data packet undergoing a physical layer process to generate a processed signal; and a processor configured to forward the signal to a second network device.

13. An assisting apparatus, for assisting a first network device in transmitting data, in a second network device of a radio network, comprising:
- a second receiver configured to receive a signal, from the first network device, forwarded by a base station, wherein the signal comprises a plurality of service data, encapsulated in the non-access stratum data packet, transmitted from one or more terminal equipments to one or more corresponding destination servers over a radio channel;
- a processor configured to recover the non-access stratum data packet from the signal and to extract the plurality of service data from the non-access stratum data packet; and
- a second transmitter configured to transmit the plurality of service data respectively to the corresponding destination server or servers.

* * * * *